W. H. EDSALL.
CURTAIN ROD BRACKET.
APPLICATION FILED AUG. 17, 1912.
1,050,437.
Patented Jan. 14, 1913.
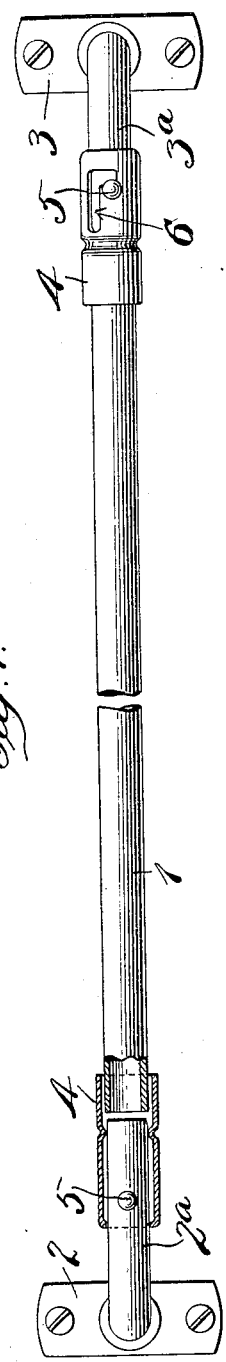
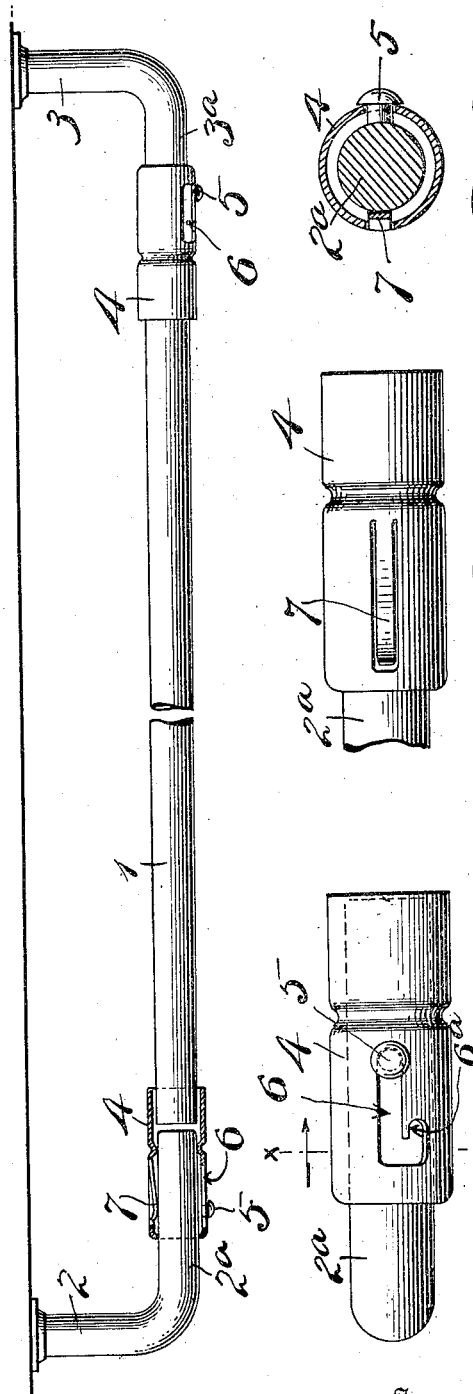
Inventor
W. H. Edsall

UNITED STATES PATENT OFFICE.

WILLIAM HENRY EDSALL, OF WALLINGFORD, CONNECTICUT.

CURTAIN-ROD BRACKET.

1,050,437.

Specification of Letters Patent.   Patented Jan. 14, 1913.

Application filed August 17, 1912.   Serial No. 715,553.

*To all whom it may concern:*

Be it known that I, WILLIAM H. EDSALL, a citizen of the United States, residing at Wallingford, county of New Haven, State of Connecticut, have invented certain new and useful Improvements in Curtain-Rod Brackets, of which the following is a full, clear, and exact description.

My invention relates to an improved curtain rod bracket, the object being to provide a bracket of an exceedingly simple and yet effective form, said bracket being so constructed that it may readily be applied and when in place will not become accidentally disengaged.

In the drawings, Figure 1 is a front elevation of my improved curtain rod bracket, showing the parts in section; Fig. 2 is a plan view thereof, also showing parts in section; Fig. 3 is a relatively enlarged detail view; Fig. 4 is a similar view; and, Fig. 5 is a cross-section on the line $x$—$x$, Fig. 3.

1 represents a curtain rod.

2—3 represent brackets arranged to support each end of the rod 1. In the particular form shown, the brackets have rod ends $2^a$—$3^a$ respectively, which receive the bracket connections. A description of a single bracket connection will be sufficient inasmuch as the connection for both brackets corresponds. Referring therefore particularly to Figs. 3 and 4, it will be seen that the bracket rod end $2^a$ therein shown is provided with a sleeve 4, which is slidable on the rod end $2^a$ and limited in its sliding movement by means of a pin 5, which is carried by the rod end $2^a$ and projects through a slot 6. $6^a$ is an offset portion of the slot 6, which forms a partial return bend. This slot serves to permit the sleeve 4 to slide to and fro and to be rotated partially so that the shank of the stud or pin 5 may be shifted into the return bend part $6^a$ of the slot when the curtain rod connector is in operative position, as shown in Fig. 1. When in this position, the forward end of the sleeve 4 forms a socket which receives and holds the end of the rod 1. I also provide means for preventing loose sliding or rotating movement of the sleeve 4 on the rod end $2^a$. In the preferred form of this means, frictional resistance is employed and to secure such frictional resistance, I provide a suitable spring carried by one of the parts. In this particular instance, the friction spring is indicated at 7, and as shown, is formed integrally with the sleeve 4, the free end of the spring being turned inwardly to press yieldingly upon the rod end $2^a$, thus holding said sleeve against either frictional or rotative movement. Hence, when the sleeve stands in the locked position, as shown at the right hand end of Figs. 1 and 2, there is no liability of jarring the sleeve loose so as to disengage the rod 1.

What I claim is:

1. In a curtain rod bracket, connector and bracket elements arranged to support a curtain rod, a sleeve mounted on said bracket rod end and likewise partially rotatable thereon, a pin on one of said parts and a slot in the other part, said pin projecting into said slot, said slot having an offset in which said pin may stand when said sleeve is projected and partially turned.

2. In a curtain rod bracket, connector and bracket elements arranged to support a curtain rod, a sleeve mounted on said bracket rod end and likewise partially rotatable thereon, a pin on one of said parts and a slot in the other part, said pin projecting into said slot, said slot having an offset in which said pin may stand when said sleeve is projected and partially turned, and means to frictionally hold the parts against unintentional displacement.

3. In a curtain rod bracket, connector and bracket elements arranged to support a curtain rod, a sleeve mounted on said bracket rod end and likewise partially rotatable thereon, a pin on one of said parts and a slot in the other part, said pin projecting into said slot, said slot having an offset in which said pin may stand when said sleeve is projected and partially turned, and means to frictionally hold the parts against unintentional displacement, said means comprising a spring carried by one part and engaging the other.

4. In a curtain rod bracket, connector and bracket elements arranged to support a curtain rod, a sleeve mount 1 on said bracket rod end and likewise partially rotatable thereon, a pin on one of said parts and a slot in the other part, said pin projecting into said slot, said slot having an offset in which said pin may stand when said sleeve is projected and partially turned, and means to frictionally hold the parts against unintentional displacement, said means comprising a spring formed integrally with the tube and projecting inwardly to engage the curtain rod bracket end.

WILLIAM HENRY EDSALL.

Witnesses:
GEO. W. BAUMAN,
RAYMOND H. GOFF.